(12) United States Patent
Bexell

(10) Patent No.: US 8,503,998 B2
(45) Date of Patent: Aug. 6, 2013

(54) WIRELESS COMMUNICATION TERMINAL AND WIRELESS COMMUNICATION METHOD

(75) Inventor: Andreas Bexell, Tokyo (JP)

(73) Assignee: Sony Mobile Communications, Inc., Tokyo (JP)

( * ) Notice: Subject to any disclaimer, the term of this patent is extended or adjusted under 35 U.S.C. 154(b) by 330 days.

(21) Appl. No.: 12/708,858

(22) Filed: Feb. 19, 2010

(65) Prior Publication Data

US 2010/0222045 A1    Sep. 2, 2010

(30) Foreign Application Priority Data

Feb. 27, 2009  (JP) ................................. 2009-047013

(51) Int. Cl.
*H04M 3/42* (2006.01)
*H04M 1/00* (2006.01)
*H04B 7/00* (2006.01)

(52) U.S. Cl.
USPC ........................ 455/416; 455/41.2; 455/553.1

(58) Field of Classification Search
USPC ...................... 455/416, 41.2, 553.1
See application file for complete search history.

(56) References Cited

U.S. PATENT DOCUMENTS

| 2004/0203381 | A1* | 10/2004 | Cahn et al. ................... 455/41.2 |
| 2006/0040692 | A1* | 2/2006 | Anttila et al. ................. 455/519 |
| 2006/0276179 | A1* | 12/2006 | Ghaffari et al. ............ 455/412.2 |
| 2007/0173238 | A1* | 7/2007 | Ali-Vehmas .................. 455/416 |

FOREIGN PATENT DOCUMENTS

JP        2003 92785        3/2003

* cited by examiner

*Primary Examiner* — Ariel Balaoing
(74) *Attorney, Agent, or Firm* — Frommer Lawrence & Haug LLP; William S. Frommer; Ellen Marcie Emas

(57) ABSTRACT

A wireless communication terminal includes a first wireless communication section configured to wirelessly communicate with a first wireless communication terminal via a base station, a second wireless communication section configured to transmit and receive data to/from a second wireless communication terminal though a short-range wireless communication link, and a controller configured to, while the wireless communication terminal itself is communicating with the first wireless communication terminal, upon detection of the existence of the second communication terminal, create a call request for requesting the second wireless communication terminal to initiate a phone call to the wireless communication terminal itself, further, cause the second wireless communication section to transmit the call request to the second wireless communication terminal, and upon receipt of the phone call which the second wireless communication terminal initiated in response to the call request, transmit a request for switching to a three-party call mode to the base station.

6 Claims, 8 Drawing Sheets

FIG. 5A

| Type | Call request |
|---|---|
| Data | <TELEPHONE NUMBER OF TERMINAL B> |

FIG. 5B

| Type | Call request confirmation |
|---|---|
| Data | <TELEPHONE NUMBER OF TERMINAL C> |

FIG. 8

| CALL CONNECTION REQUEST FROM 090-XXXX-XXXX |
|---|
| - REFUSAL |
| - ACCEPTANCE |
| - ACCEPTANCE (THREE PARTY CALL) |

WIRELESS COMMUNICATION TERMINAL AND WIRELESS COMMUNICATION METHOD

BACKGROUND OF THE INVENTION

1. Field of the Invention

The present invention relates to wireless communication terminals and wireless communication methods using wireless communication terminals, and in particular, it relates to a group of wireless communication terminals each being capable of communicating with any wireless communication terminal within the group through a wireless communication link conforming to a relevant short-range wireless communication standard, such as the Near Field Communication (NFC) standard, and further, a wireless communication method using such a group of wireless communication terminals.

2. Description of the Related Art

To date, a three-party call service, which enables three parties to conduct a phone conversation with each other, has been provided by communication service providers each providing a mobile telephone service using mobile telephone terminals. For example, in the case where, while two parties are already communicating with each other, one of the two parties desires to commence a three party call by allowing one more different party to participate in the phone call as a third party, the one of the two parties can commence the three party call by performing operations of inputting a telephone number of the third party, pushing a call button, and the like. Further, the three party call is realized by causing three mobile telephone terminals to each perform relevant communication processing between themselves and a base station corresponding thereto.

For this reason, even in the case where a third party, who is desired to participate in a phone call which two parties are already involved in, is located very near the two parties, in order to commence a three party call by allowing the third party to participate in the phone call, it is necessary for users to perform the above-described processing, and this necessity of performing the above-described processing leads to a disadvantage in that it is troublesome for users to commence a three party call.

With respect to a method to overcome such a disadvantage, for example, in Japanese Unexamined Patent Application Publication No. 2003-92785, a technology, in which, as a result of relevant processing performed over a wireless communication link conforming to the Bluetooth (trademark) standard, a three party call is established, is described.

SUMMARY OF THE INVENTION

According to a method disclosed in the technology described in Japanese Unexamined Patent Application Publication No. 2003-92785, an operation of specifying an ID of a three-party-call requested wireless communication terminal results in making a phone call thereto through communications over a wireless communication link conforming to the Bluetooth standard. However, in this method, in order to commence a three party call, it is difficult to omit the operation of specifying an ID of a three-party-call requested wireless communication terminal. Thus, in such a method, there has been a disadvantage in that it is difficult to reduce the number of troublesome operations to be performed by users when commencing a three party call.

Accordingly, it is desirable to provide wireless communication terminals which enable users to easily commence a third party call without performing troublesome operations, and a wireless communication method using such the wireless communication terminals.

A wireless communication terminal according to an embodiment of the present invention includes a first wireless communication section configured to wirelessly communicate with a first wireless communication terminal via a base station and a second wireless communication section configured to transmit and receive data to/from a second wireless communication terminal through a short-range wireless communication link. Further, the wireless communication terminal according to an embodiment of the present invention includes a controller which is configured to, while the wireless communication terminal itself is communicating with the first wireless communication terminal, upon detection of an existence of the second communication terminal, create a call request for requesting the second wireless communication terminal to initiate a phone call to the wireless communication terminal itself, further, cause the second wireless communication section to transmit the call request to the second wireless communication terminal and receive a call response from the second wireless communication terminal. Further, the controller is configured to, upon receipt of the phone call, which the second wireless communication terminal initiated in response to the call request, cause the first wireless communication section to transmit a request for switching from a two-party call mode to a three-party call mode to the base station.

Providing such the wireless communication terminals allows relevant wireless communication terminals to transmit and receive pieces of information necessary to commence a three party call through a short-range wireless communication link, further, allows one of the relevant wireless communication terminals to transmit a request for switching from a two-party call mode to a three-party call mode to a base station, and thus, enables users to easily commence a three party call by allowing the users to merely perform an operation for making their own wireless communication terminals to be located adjacent each other.

BRIEF DESCRIPTION OF THE DRAWINGS

FIGS. 5A and 5B are diagrams illustrating examples of configurations of a call request and a call response, respectively, according to the present invention;

FIG. 8 a diagram illustrating an example of a display screen displayed by a three-party-call requesting mobile telephone terminal, according to an embodiment of the present invention.

DESCRIPTION OF THE PREFERRED EMBODIMENTS

Hereinafter, an example of an embodiment according to the present invention (hereinafter, which will be sometimes referred to as "this example") will be described with reference to accompanying drawings. In this embodiment, a wireless communication terminal according to the present invention is applied to a mobile telephone terminal which wirelessly communicates with other mobile telephone terminals in accordance with the Near Field Communication (NFC) standard.

[Example of Configuration of Mobile Telephone Terminal]

Figure 1A:
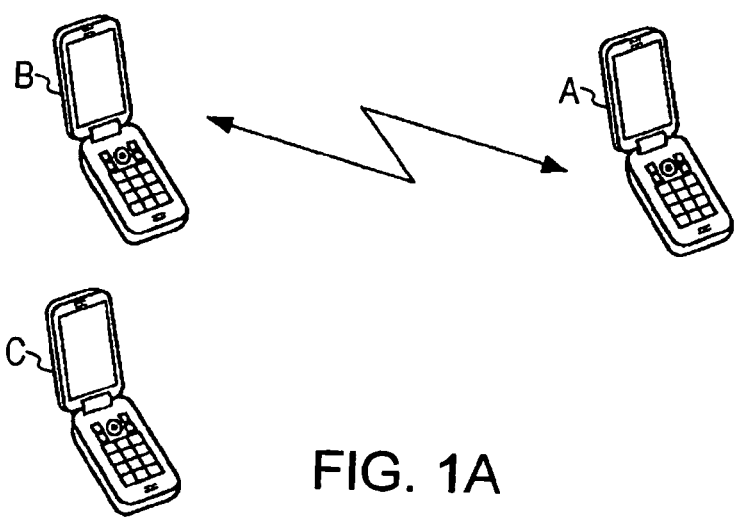
FIGS. 1A, 1B and 1C are diagrams illustrating a concept of an embodiment of the present invention.
Figure 1B:
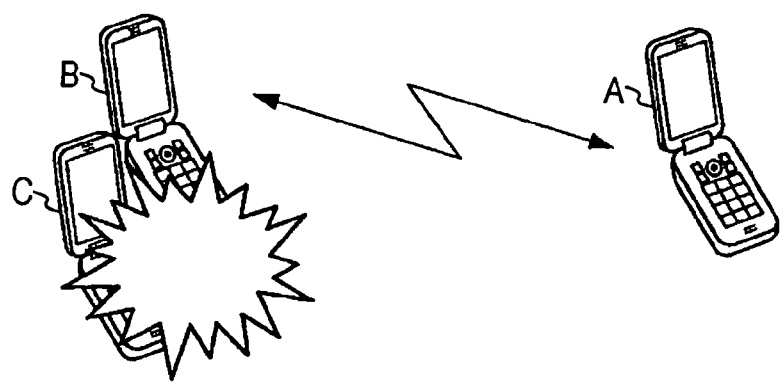
Figure 1C:
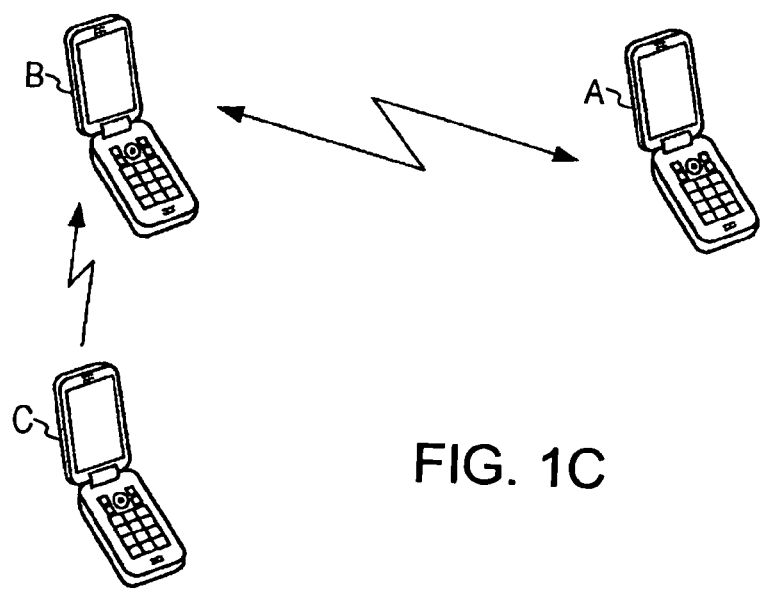

FIGS. 1A, 1B and 1C are diagrams each illustrating an outline of this example. FIG. 1A shows a condition in which a user Ua of a mobile telephone terminal A and a user Ub of a mobile telephone terminal B are communicating with each other (both the user Ua and the user Ub being omitted from illustration), and a user Uc of a mobile telephone terminal C is located near the mobile telephone terminal B (the user Uc being omitted from illustration). Here, in the case where the user Ub desires to initiate a three party call by allowing the user Uc to participate in the communication between the user Ua and the user Ub, the user Ub performs an operation so as to cause his or her own mobile telephone terminal B to be touched with (or be located adjacent to) the mobile telephone terminal C owned by the user Uc, as shown in FIG. 1B.

In this case, the mobile telephone terminal B and the mobile telephone terminal C perform communication therebetween in accordance with the NFC standard, through which pieces of data such as a call request and a call response are transmitted and received, thereby, the mobile telephone terminal C initiates a phone call to the mobile telephone terminal B, and further, immediately after this process has been successfully completed, a three party call among the mobile telephone terminals A, B and C is commenced, as shown in FIG. 1C. In this case, the call request is a piece of data indicating a request for initiating a phone call from a three-party-call requesting mobile telephone terminal, which is communicating with another mobile telephone terminal, to a three-party-call requested mobile telephone terminal, which is located near the three-party-call requesting mobile telephone terminal. Further, the call response is a piece of data indicating a confirmation of the call request. On the basis of these pieces of data, a controller, which will be described below, included in each of the mobile telephone terminals performs control so as to switch from a two party call to a three party call. That is, as a result, a request for switching from a two party call to a three party call is transmitted to a base station. Details of the call request and the call response will be described below.

Figure 2:
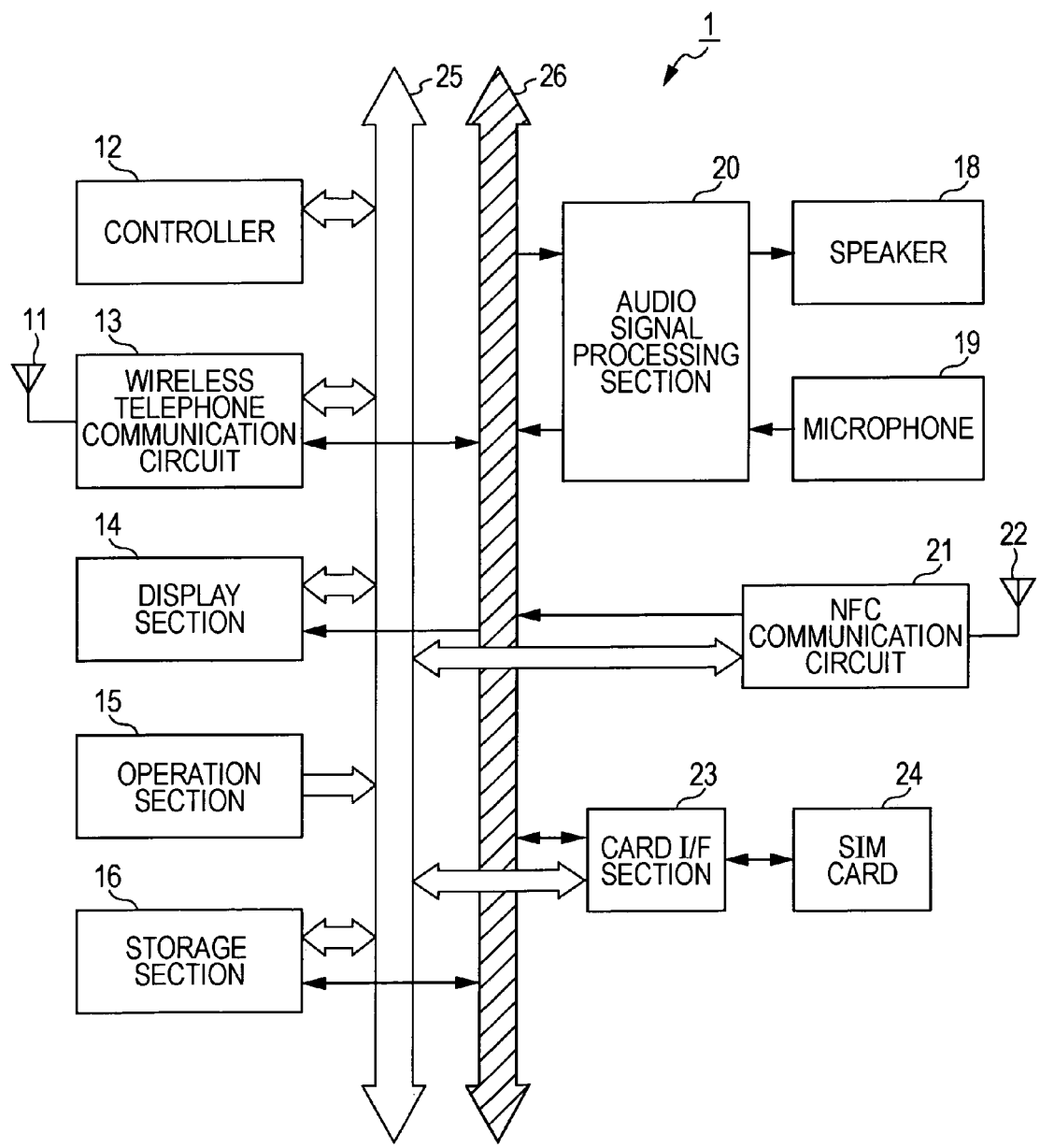
FIG. 2 is a block diagram illustrating an example of an internal configuration of a mobile telephone terminal according to an embodiment of the present invention.

FIG. 2 is a block diagram illustrating an example of a configuration of a mobile telephone terminal (hereinafter, sometimes referred to as "a terminal") according to this example. In addition, the configuration shown in FIG. 2 is the same for all the mobile telephone terminals A, B and C shown in FIGS. 1A, 1B and 1C. A mobile telephone terminal 1 shown in FIG. 2 is configured to include two kinds of wireless communication sections, one being a first wireless communication section, i.e., a wireless telephone communication circuit 13, configured to wirelessly communicate with base stations for a wireless telephone system, the other one being a second wireless communication section, i.e., an NFC communication circuit 21, configured to wirelessly communicate with other terminals which are located near the mobile telephone terminal 1. The wireless telephone communication circuit 13 and the NFC communication circuit 21 are configured to include antennas 11 and 22, respectively.

Operations regarding wireless communications in the wireless telephone communication circuit 13 and the NFC communication circuit 21 are executed in accordance with control performed by a communication controller 122 inside the controller 12 of the mobile telephone terminal 1. The communication controller 122 is also configured to perform control of processing for establishing a wireless communication link with a base station. Further, the controller 12 is configured to also include an application controller 121, which is configured to transmit and receive control signals and pieces of data to/from individual sections inside the mobile telephone terminal 1 via a control line 25 and a data line 26, and thereby, perform control of individual functions other than functions of wireless communications. Further, the application controller 121 is configured to create the call request and the call response. In addition, in this example, the controller 12 is configured to include the application controller 121 and the communication controller 122 in a separated manner, but the configuration is not limited to such a configuration, but may be realized by one section in an integrated manner.

The wireless telephone communication circuit 13 is configured to, in the case where pieces of audio data are included in received packets, extract the pieces of audio data, and supply the extracted pieces of audio data to an audio signal processing section 20 via the data line 26. The audio signal processing section 20 is configured to demodulate the supplied pieces of audio data into analog audio signals, supply the demodulated analog signals to a speaker 18, and output the audio signals from the speaker 18.

Further, the mobile telephone terminal 1 is configured to include a microphone 19, by which audio signals are collected. The audio signals collected by the microphone 19 are supplied to the audio signal processing section 20, which is configured to modulate the supplied audio signals into pieces of audio data to be transmitted. The modulated pieces of audio data are supplied to the wireless telephone communication circuit 13, which is configured to perform processing for allocating the supplied pieces of audio data into packets to be transmitted to a base station, and further, wirelessly transmit the audio packets, having been subjected to the above-described processing, to the base station via the antenna 11.

Moreover, the mobile telephone terminal 1 is configured to include a display section 14, which is realized by a liquid crystal display panel or the like, and display various kinds of information thereon in accordance with control performed by the controller 12. The various kinds of information displayed thereon include information related to initiating phone calls and receiving phone calls, information stored in a telephone number list and an e-mail address list, received e-mails and transmitted e-mails, images having been downloaded by accessing the Internet and the like.

The mobile telephone terminal 1 is configured to include an operation section 15, and on the basis of operations performed by using this operation section 15, cause the controller 12 to execute various processes. For example, initiating phone calls through a wireless telephone communication link, transmitting and receiving e-mails, and starting and terminating data communication, such as accessing the Internet, are executed by operating keys or the like which are provided as the operation section 15.

Further, the control line 25 and the data line 26 are configured to be connected to a storage section 16, and for example, pieces of data which have been received from outside and are to be retained are configured to be stored in the storage section 16. Moreover, programs to be executed in control processing performed by the controller 12 are also stored in the storage section 16.

The NFC communication circuit 21 is a circuit which is configured to perform a data communication with any of mobile telephone terminals each having a configuration the same as that of the mobile telephone terminal 1, and other types of terminal devices, in accordance with a wireless communication method conforming to the NFC standard. In addition, data transmission and reception to/from other terminals are performed, for example, in a peer-to-peer mode provided by the NFC standard.

Further, the mobile telephone terminal 1 is configured to include a card interface section 23 functioning as an adapter, which has a subscriber identity module (SIM) card 24 inserted thereinto. The SIM card 24 stores pieces of information therein, such as pieces of identification information regarding users of the mobile telephone terminals 1 and telephone numbers thereof. Operations for reading and writing data from/into the SIM card 24 are carried out by the controller 12 and the NFC communication circuit 21.

Figure 3:
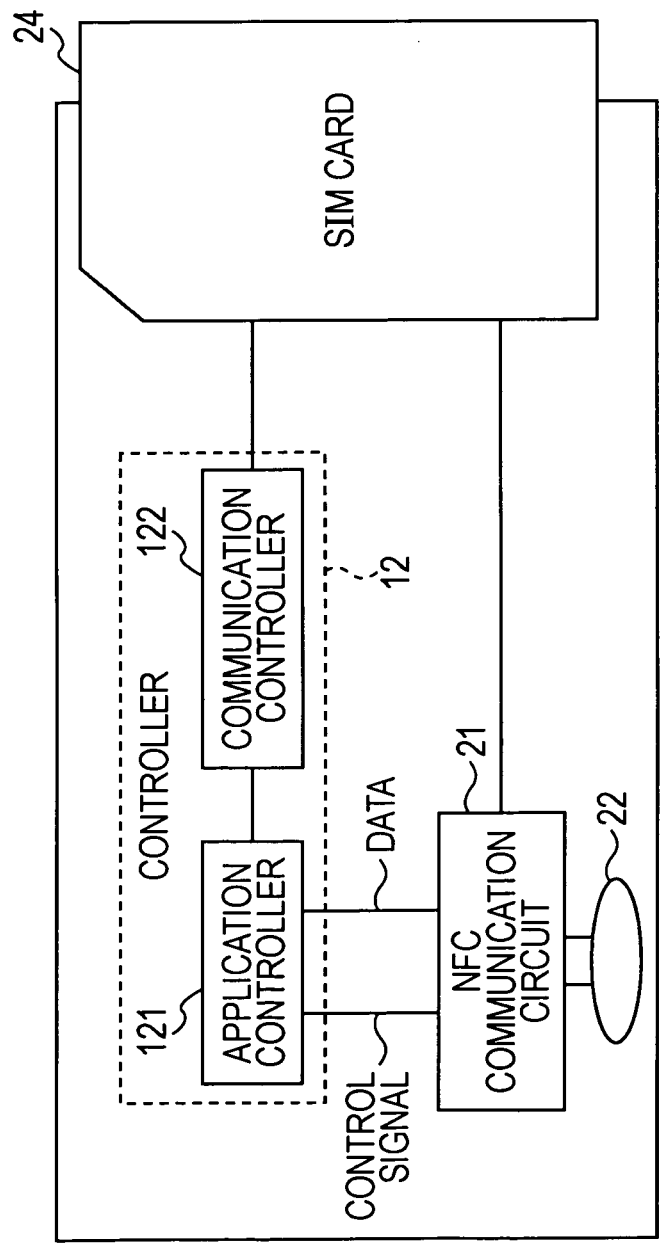
FIG. 3 is a block diagram illustrating functions included in an NFC communication circuit according to an embodiment of the present invention.

Next, details of functions included in the NFC communication circuit 21 will be described with reference to FIG. 3. FIG. 3 shows a condition in which the NFC communication circuit 21 is connected to the application controller 121 inside the controller 12, and further, the SIM card 24.

The NFC communication circuit 21 is configured to supply the application controller 121 and the SIM card 24 with pieces of data which have been received via the antenna 22, and inversely, supply the antenna 22 with pieces of data outputted therefrom. Further, the NFC communication circuit 21 is also configured to create control signals and supply the created signals to the application controller 121.

The control signals and the received pieces of data are supplied to the application controller 121 through, for example, the General Purpose Input/Output (GPIO) interface and the Serial Peripheral Interface (SPI), respectively, both of which are included in the application controller 121.

[Example of Operations Performed by Mobile Telephone Terminal]

Figure 4:
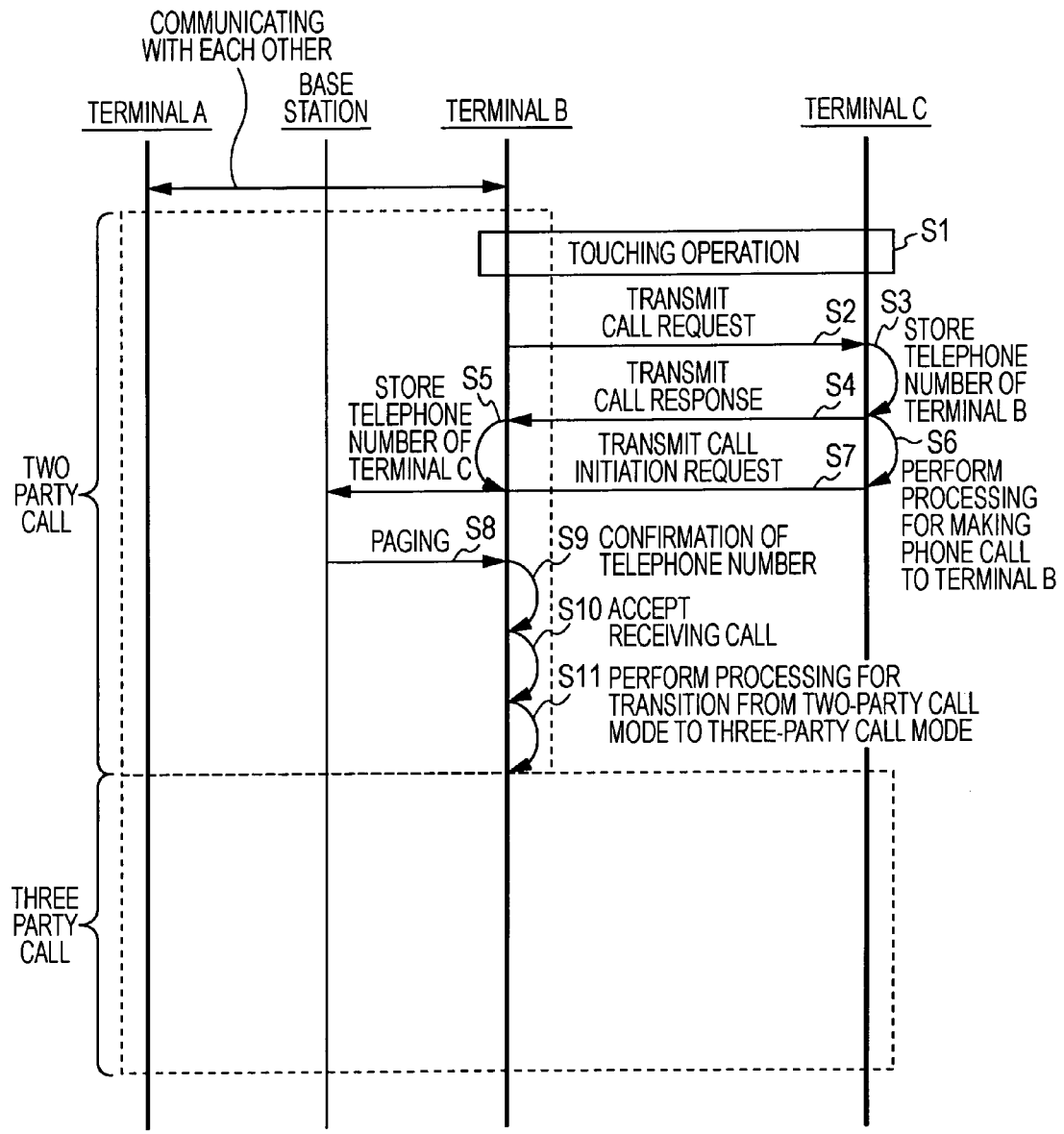
FIG. 4 is a sequence chart illustrating processes performed among mobile telephone terminals and a base station, according to an embodiment of the present invention.

Next, an example of operations performed by the mobile telephone terminal 1 in the case where the mobile telephone terminal 1 commences a third party call will be described with reference to a sequential chart shown in FIG. 4. In FIG. 4, portions corresponding to those shown in FIG. 1 are denoted by symbols the same as those of the corresponding portions shown in FIG. 1. That is, FIG. 4 shows an example of processes performed in the case where, under the condition in which the user Ua of the mobile telephone terminal A and the user Ub of the mobile telephone terminal B have already been communicating with each other, the user Uc of the mobile telephone terminal C, which is located near the mobile telephone terminal B, is allowed to participate in a third party call among the users Ua, Ub and Uc.

Firstly, once the user Ub, who is communicating with the user Ua, performs an operation so as to cause the mobile telephone terminal B to be touched with the mobile telephone terminal C (in step S1), subsequently, in accordance with control performed by the NFC communication circuit 21 (refer to FIG. 1), a communication link between the two terminals, which conforms to the NFC standard, is established, and then, a call request is transmitted from the mobile telephone terminal B to the mobile telephone terminal C through the communication link conforming to the NFC standard (in step S2).

The call request is used for requesting another mobile telephone terminal to participate in a third party call, and therein, as shown in FIG. 5A, there are descriptions including a piece of information "Type: Call request", which indicates that this kind of data is the call request, and a telephone number of a three-party-call requesting side (in this case, which is the mobile telephone terminal B).

Upon receipt of the call request having been transmitted from the mobile telephone terminal B in step S2 shown in FIG. 4, the mobile telephone terminal C stores the telephone number included in the call request (in step S3), further, creates a call response, and then, sends it back to the mobile telephone terminal B (in step S4).

In the call response, as shown in FIG. 5B, there are descriptions including a piece of information "Type: Call request confirmation", which indicates that this kind of data is the call response, and a telephone number of a three-party-call requested side (in this case, the mobile telephone terminal C).

Upon receipt of the call response, the mobile telephone terminal B extracts the telephone number of the mobile telephone terminal C included in the received call response, and stores it therein (in step S5). Meanwhile, the mobile telephone terminal C performs processing for making a phone call to the mobile telephone terminal B on the basis of the stored telephone number (in step S6), and then, transmits a call initiation request to a base station (in step S7).

Immediately after setting of communication links and the like has been completed at the base station, a paging message, i.e., a receiving call, indicating a paging of the mobile telephone terminal B is transmitted from the base station (in step S8). Further, the mobile telephone terminal B determines whether a telephone number included in the paging message, i.e., the receiving call, corresponds to the telephone number having been stored therein, or not (in step S9), and in the case where the determination is true, the receiving call is accepted by the mobile telephone terminal B as a receiving call targeted for a three party call (in step S10). Upon acceptance of the receiving call as a receiving call targeted for the three party call, processing for switching from a two-party call mode to a three-party call mode is performed in accordance with control performed by the NFC communication circuit 21 (in step S11), and then, through communication links with base stations, the three party call among the mobile telephone terminals A, B and C is commenced.

Figure 6:
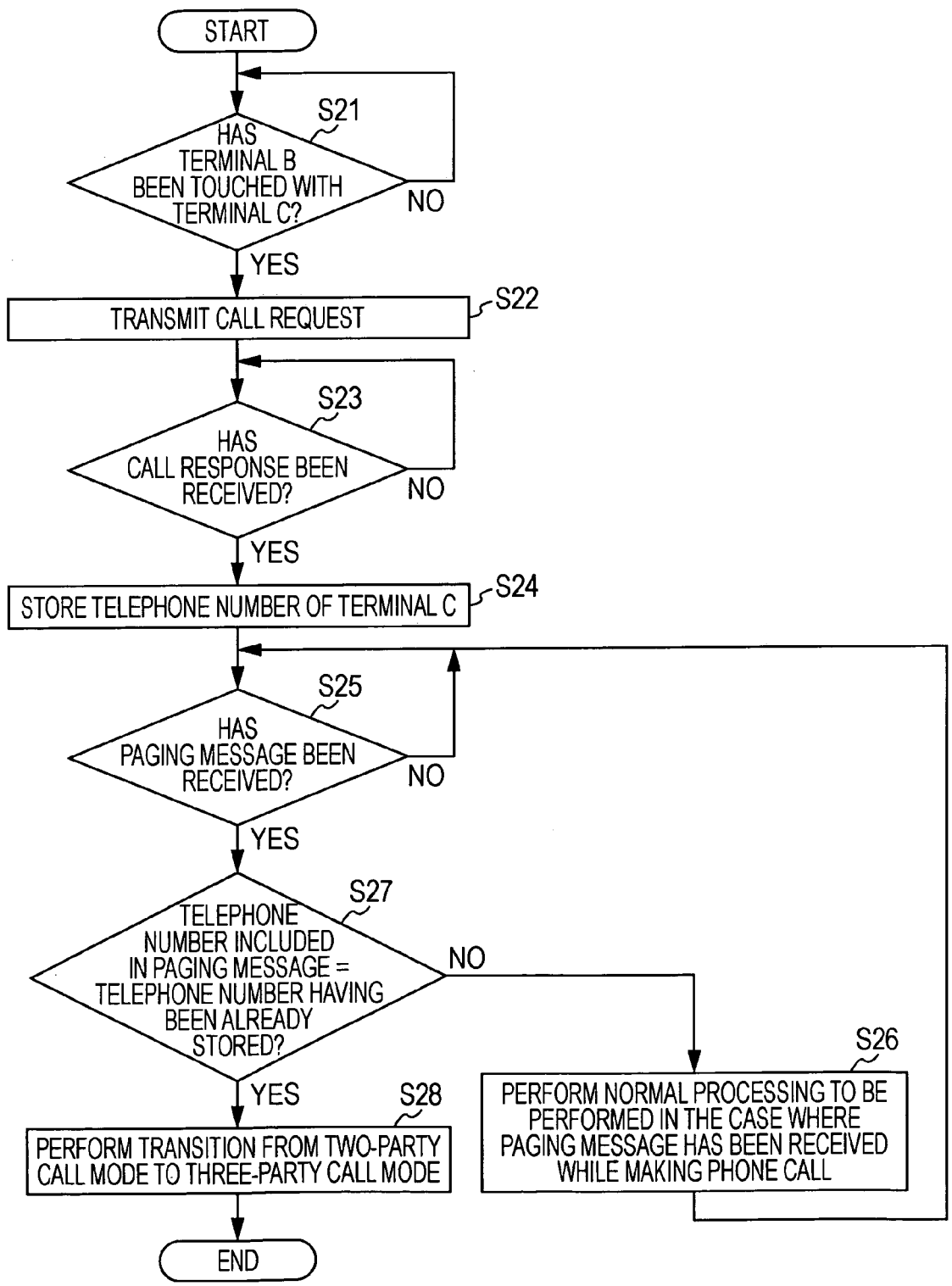
FIG. 6 is a flowchart illustrating an example of processes performed by a three-party-call requesting mobile telephone terminal, according to an embodiment of the present invention.
Figure 7:
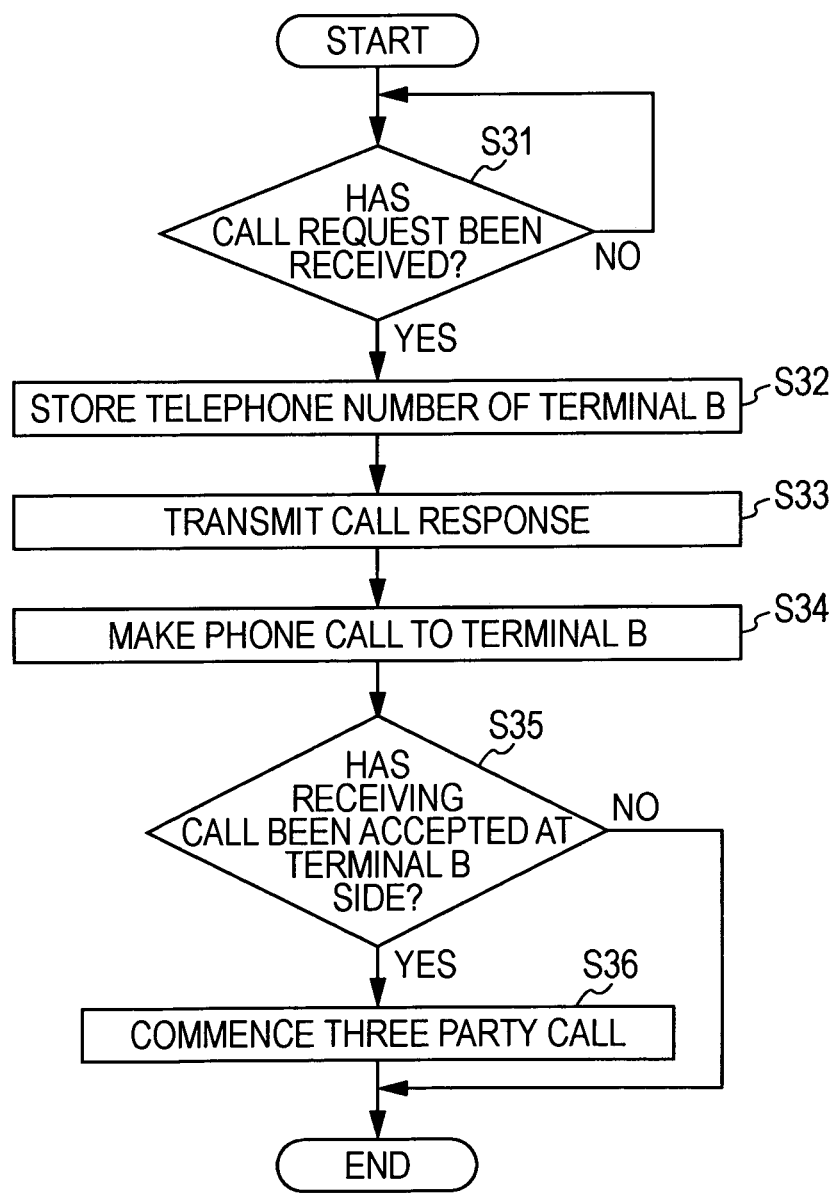
FIG. 7 is a flowchart illustrating an example of processes performed by a three-party-call requested mobile telephone terminal, according to an embodiment of the present invention.

Next, details of processes performed by the mobile telephone terminal B, which is a three-party-call requesting side, and the mobile telephone terminal C, which is a three-party-call requested side, will be described with reference to flowcharts shown in FIGS. 6 and 7. Firstly, processes performed by the mobile telephone terminal B, which is a three-party-call requesting side, will be hereinafter described.

The mobile telephone terminal B determines whether any touch operation with the mobile telephone terminal C has occurred, or not (in step S21). In the case where any touch operation with the mobile telephone terminal C has not yet occurred, that is, the mobile telephone terminals B and C are in the condition where the mobile telephone terminals B and C are not capable of communicating with each other in accordance with the NFC standard, the determination processing to be performed in step S21 is iterated. In the case where any touch operation with the mobile telephone terminal C has already occurred, and further, an electric wave originating from the mobile telephone terminal C has been confirmed, a call request is transmitted to the mobile telephone terminal C through a communication link conforming to the NFC standard (in step S22).

Subsequently, the mobile telephone terminal B determines whether a call response to be transmitted from the mobile telephone terminal C has been already received, or not (in step S23), in the case where the call response has not yet been received, processing for this determination is iterated. In the case where the call response has been already received, the mobile telephone terminal B extracts and stores therein a telephone number of the mobile telephone terminal C, which is included in the call response.

Further, the mobile telephone terminal B determines whether a paging message from the mobile telephone terminal C has been received, or not (in step S25), and until the paging message from the mobile telephone terminal C has been received, the mobile telephone terminal B enters a waiting condition. Upon receipt of the paging message from the mobile telephone terminal C, the mobile telephone terminal B determines whether a telephone number of a calling party, which is included in the paging message, corresponds to the telephone number having been stored in Step 24, or not (in step S27). In the case where, as a result of the determination, the telephone number of a calling party does not correspond to the stored telephone number, processing the same as or similar to that to be performed in the normal case where a receiving call from a certain mobile telephone terminal has been detected under the condition where the mobile telephone terminal B is communicating with another party is performed (in step S26).

In the case where, as a result of the determination, the telephone number of a calling party corresponds to the stored telephone number, processing for switching from a two-party call mode to a three-party call mode is performed, and then, through communication links with base stations, a three party call is commenced (in step S28).

Next, details of processes performed by the mobile telephone terminal C, which is a three-party-call requested side, will be described below with reference to FIG. 7. The mobile telephone terminal C determines whether a call request from the mobile telephone terminal B has been received, or not (in step S31), through a communication link conforming to the NFC standard, which was established being triggered by a touching operation with the mobile telephone terminal B. Next, in the case where the mobile telephone terminal C determines that the call request has been already received, the mobile telephone terminal C extracts and stores therein the telephone number of the mobile telephone terminal B (in step S32), which is included in the call request, and causes the application controller 121 (refer to FIG. 1) to create a call response, which is transmitted to the mobile telephone terminal B via the antenna 22 (refer to FIG. 1) (in step S33).

Subsequently, the mobile telephone terminal C initiates a phone call to the mobile telephone terminal B (in step S34), and determines whether the initiated phone call has been accepted, or not (in step S35), by the mobile telephone terminal B. In the case where the initiated phone call has not been accepted, the flow of processing is terminated. In the case where the initiated phone call has been accepted, processing for switching from a two-party-call mode to a third-party-call mode is performed, and then, the three party call is commenced (in step S36).

[Advantage Facilitated by Embodiment]

According to the above-described embodiment, performing an operation so as to cause the mobile telephone terminals 1 to be touched with each other (or be located adjacent each other), allows a communication link therebetween to be established, further, through the communication link, causes a call request and a call response to be transmitted/received therebetween, and thereby, enables automatically commencing a three party call. Therefore, it is possible for users to easily perform switching from a two party call to a three party call without performing the number of troublesome operations of inputting a telephone number of the mobile telephone terminal 1, which is requested to participate in the three party call, pushing a talk button and the like.

Furthermore, according to the above-described embodiment, it is possible for a user of the three-party-call requested mobile telephone terminal 1 to participate in the three party call without performing any operations.

[Modified Example]

In addition, in the above-described embodiment, a three party call is realized by involving the mobile telephone terminals A, B and C in the three party call, but may be realized by involving a fixed-line telephone terminal A' therein as a substitute for the mobile telephone terminal A.

Further, in the above-described embodiment, an example, in which a three party call is automatically commenced when a paging message from the mobile telephone terminal C has been accepted by the mobile telephone terminal B, is provided, but an indication for requesting a user to select acceptance or unacceptance of switching from a two party call to a three party call may be represented to a user at the mobile telephone terminal B side.

An example of indications on the display screen of the mobile telephone terminal 1 in this case is shown in FIG. 8. On the first line of the display screen shown in FIG. 8, a message of characters "090-XXXX-XXXX" is indicated, and below it, three choices of "refusal", "acceptance" and "acceptance (three party call)" are indicated. Here, the message of characters "090-XXXX-XXXX" is a telephone number of the mobile telephone terminal C in the examples shown in FIGS. 1 and 4.

These indications are displayed by the controller 12 when a paging message from the mobile telephone terminal C has been received in step S8 shown in FIG. 4. By using these indications, the user Ub of the mobile telephone terminal B selects the "refusal" in the case where the user Ub does not desire to commence a call with the user Uc of the mobile telephone terminal C, and thereby, the user Ub can terminate the call which was initiated by the mobile telephone terminal C. Further, by selecting the "acceptance", the user Ub can commence a two party call with the user Uc of the mobile telephone terminal C, and further, by selecting the "acceptance (three party call)", the user Ub can commence a three party call.

Further, in the above-described embodiment, an example, in which pieces of data are transmitted and received through a wireless communication link conforming to the NFC standard, is provided, but the present invention is not limited to this example. For example, the present invention may be applied to configurations, in which wireless communications conforming to other short-range wireless communication standards, such as the Bluetooth, are performed.

The present application contains subject matter related to that disclosed in Japanese Priority Patent Application JP 2009-047013 filed in the Japan Patent Office on Feb. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication terminal, comprising:
   a first wireless communication section configured to wirelessly communicate with a first wireless communication terminal via a base station;
   a second wireless communication section configured to transmit and receive data to/from a second wireless communication terminal through a short-range wireless communication link; and
   a controller configured to, while the wireless communication terminal itself is communicating with the first wireless communication terminal, based upon the second wireless communication terminal and the wireless communication terminal touching each other, (a) create a call request for requesting the second wireless communication terminal to initiate a phone call to the wireless communication terminal itself, (b) cause the second wireless communication section to transmit the call request to the second wireless communication terminal, (c) receive a call response from the second wireless communication terminal, and (d) upon receipt of the phone call, which the second wireless communication terminal initiated in response to the call request, automatically cause the first wireless communication section to transmit a request to the base station for switching from a two-party call mode to a three-party call mode.

2. The wireless communication terminal according to claim 1, wherein each of a piece of data forming the call request and a piece of data forming the call response includes therein a telephone number of a wireless communication terminal which creates the corresponding piece of data.

3. The wireless communication terminal according to claim 2, wherein, in the case where the wireless communication terminal itself receives the call request from another wireless communication terminal, the controller is further configured to, upon receipt of the call request, extract a telephone number included in the call request, store the extracted telephone number therein, and initiate a phone call using the telephone number.

4. The wireless communication terminal according to claim 2, wherein the controller is configured to, upon receipt of the call response, extract a telephone number included in the call response, store the extracted telephone number therein, and upon receipt of a phone call after the storage of the telephone number, determine whether a telephone number included in the received phone call corresponds to the stored telephone number, and in the case where the telephone number included in the received phone call corresponds to the stored telephone number, transmit the request for switching from a two-party call mode to a three-party call mode to the base station.

5. The wireless communication terminal according to claim 4, further comprising a display section configured to display characters and images,
   wherein the controller is further configured to, upon receipt of the phone call initiated by the second wireless communication terminal, display an indication for requesting a user to select acceptance or unacceptance of the received phone call.

6. A wireless communication method, comprising the steps of:
   creating a call request for requesting a third wireless communication terminal to initiate a phone call to a first wireless communication terminal, and further, transmitting the call request to the third wireless communication terminal, the creation and the transmission being performed by the first wireless communication terminal based upon the first wireless communication terminal and the third wireless communication terminal touching each other while the first wireless communication terminal is communicating with a second wireless communication terminal via a base station; and
   automatically transmitting a request to the base station for switching from a two-party call mode to a three-party call mode, the transmission being performed by the first wireless communication terminal when the first wireless communication terminal has received a phone call from the third wireless communication terminal which the third wireless communication terminal initiated in response to the call request.

* * * * *